United States Patent
Asawa et al.

(10) Patent No.: US 7,746,864 B1
(45) Date of Patent: Jun. 29, 2010

(54) SYSTEM AND METHOD FOR ROUTING INTER-CARRIER SHORT MESSAGE SERVICE OR MULTIMEDIA MESSAGE SERVICE MESSAGES

(75) Inventors: Manjari Asawa, Cupertino, CA (US); Brandie Proctor Roberts, Berkeley, CA (US)

(73) Assignee: Cello Partnership, Basking Ridge, NJ (US)

( * ) Notice: Subject to any disclaimer, the term of this patent is extended or adjusted under 35 U.S.C. 154(b) by 176 days.

(21) Appl. No.: 12/149,311

(22) Filed: Apr. 30, 2008

(51) Int. Cl.
*H04L 12/56* (2006.01)

(52) U.S. Cl. .................... 370/392; 370/401; 370/466

(58) Field of Classification Search .................. None
See application file for complete search history.

(56) References Cited

U.S. PATENT DOCUMENTS

| | | | |
|---|---|---|---|
| 7,003,307 B1 | 2/2006 | Kupsh et al. | |
| 2002/0024943 A1* | 2/2002 | Karaul et al. | 370/338 |
| 2004/0196858 A1* | 10/2004 | Tsai et al. | 370/401 |
| 2004/0258063 A1 | 12/2004 | Raith et al. | |
| 2005/0265525 A1 | 12/2005 | Tang et al. | |
| 2006/0098621 A1* | 5/2006 | Plata Andres et al. | 370/352 |
| 2006/0104432 A1* | 5/2006 | Evslin | 379/220.01 |
| 2006/0209794 A1* | 9/2006 | Bae et al. | 370/352 |
| 2007/0019623 A1* | 1/2007 | Alt et al. | 370/352 |
| 2007/0078986 A1* | 4/2007 | Ethier et al. | 709/227 |
| 2007/0088848 A1 | 4/2007 | Chen et al. | |
| 2007/0093233 A1* | 4/2007 | Lovell | 455/405 |
| 2007/0133574 A1* | 6/2007 | Tejani et al. | 370/401 |
| 2007/0189500 A1* | 8/2007 | Stanford | 379/355.01 |
| 2007/0287413 A1 | 12/2007 | Kleitsch et al. | |
| 2008/0025492 A1 | 1/2008 | Heinze et al. | |
| 2008/0119210 A1* | 5/2008 | Snyder et al. | 455/466 |
| 2008/0130663 A1* | 6/2008 | Fridman et al. | 370/401 |
| 2008/0168540 A1* | 7/2008 | Agarwal et al. | 726/5 |
| 2009/0081991 A1* | 3/2009 | Titus et al. | 455/408 |
| 2009/0098875 A1* | 4/2009 | De Beer | 455/445 |
| 2009/0136012 A1* | 5/2009 | Boyd et al. | 379/142.15 |
| 2009/0154452 A1* | 6/2009 | Ku et al. | 370/389 |

OTHER PUBLICATIONS

Crowe, David, "Cellular Networking Perspectives: Let me MMS you the baby pictures!" Wireless Telecom Magazine Article, Q4, Issue 2003, pp. 1-8.
"Telephone Number Mapping," Wikipedia, the free Encyclopedia, http://en.wikipedia.org/wiki/ENUM, Jan. 15, 2008, pp. 1-7.
Ramirez, Alejandro et al., "Billing for MMS," CSG Systems Confidential and Proprietary, Oct. 2002, pp. 1-11.

* cited by examiner

*Primary Examiner*—Hong Cho
*Assistant Examiner*—Robert C Scheibel
(74) *Attorney, Agent, or Firm*—McDermott Will & Emery LLP

(57) ABSTRACT

A message originates from a mobile station which is operable within a wireless network. In disclosed examples, the wireless network has a Messaging Service Center (MSC). The MSC determines whether the MSC stores a Uniform Resource Identifier (URI) corresponding to a destination mobile directory number (MDN) that is inputted via the mobile station. Then, the MSC sends the message to the URI corresponding to the MDN if the first MSC stores the URI corresponding to the MDN. The MSC sends a request to find the URI corresponding to the destination MDN to an external tElephone NUmber Mapping (ENUM) server, if the first MSC does not store the URI corresponding to the destination MDN. The MSC sends the message to the URI corresponding to the destination MDN if the external ENUM server sends the URI corresponding to the destination MDN. The MSC also indicates charging policy for delivery of message based on a billing identification corresponding to the destination MDN or URI that is stored in the MSC in the same table.

10 Claims, 4 Drawing Sheets

| | ROUTING DOMAIN FIELD | BILLING ID |
|---|---|---|
| 202-111-2222 | DOMAIN A | PLAN 1 |
| 011-81-2659-4444 | DOMAIN B | PLAN 2 |
| 011-82-3333-4444 | ENUM | PLAN 3 |
| ⋮ | ⋮ | ⋮ |

SYSTEM AND METHOD FOR ROUTING INTER-CARRIER SHORT MESSAGE SERVICE OR MULTIMEDIA MESSAGE SERVICE MESSAGES

FIELD OF THE INVENTION

The present subject matter relates to a method and a system for routing Short messaging service (SMS) or Multimedia messaging service (MMS) messages to an international destination terminal and charging for the SMS and MMS messages routed to the international destination terminal.

BACKGROUND

Mobile communication networks have evolved over time such that a variety of services are available on a mobile, station other than original voice services. A Short Messaging Service (SMS) is one of advanced services available to the mobile station which allows exchange of text messages between mobile stations. SMS may also offer message exchange with personal computers or the like by providing an SMS interface between the Internet and an SMS server associated with a cellular-based circuit-switched subsystem, which supports the mobile stations having SMS capability.

In the time of the second-generation (2G) mobile communication network technologies, development of data service was limited because of network bandwidth constraints and the intrinsic disadvantages of the SMS are difficult to overcome. With the development and deployment of the third-generation (3G) mobile communication system, various data services based on 3G technologies have been developing rapidly and have a wider field than that based on the 2G mobile communication system.

A Multimedia Messaging Service (MMS) is a further development of the SMS following introduction of the 3G mobile communication system. The MMS provides a complete end-to-end solution for personal multimedia mobile communication services. In view of the contents of communications, a multimedia message may consist of any or all of pictures, audio, video and text. In view of the capabilities, it covers various types of multimedia communications including terminal-to-terminal, terminal-to-application server, and application server-to-terminal. Thus the multimedia messaging service not only accomplishes message exchanges among the terminals, between the terminal and the application server, MMS also combines multiple contents such as picture, voice, video and/or text.

As the number of mobile communication carriers increases nationwide, proper and accurate deliveries of the SMS/MMS messages and charging for the SMS/MMS message service are desirable. As a way to assist the routing of SMS/MMS messages in a 3G network, an tElephone NUmber Mapping (ENUM) system, which facilitates the interconnection of communication networks that rely on telephone numbers with the communication networks that utilize the Domain Name Systems (DNS), has been introduced.

As mobile station users change their carrier, they would like to retain their mobile station numbers. As a way to meet the need, some countries including the U.S. implement Number Portability policy which enables mobile station users to retain their mobile station numbers when changing from one carrier to another carrier. It is, however, cumbersome for mobile carrier operators to have accurate knowledge of Number Portability policy and databases for each international destination. Hence, the ENUM servers will be enhanced to serve international destination numbers to accommodate the Number Portability policies of various countries. However, many countries do not have a centralized data server. Therefore, it is a huge burden having accurate ENUM data for international destination mobile stations.

Therefore, a need exists for routing SMS/MMS messages to an international destination mobile station located in a foreign country whether the foreign country implements a centralized Number Portability database or not.

Furthermore, various domestic and foreign carriers have adopted different billing policies with each other for deliveries of the SMS/MMS messages. To support these different billing policies by the domestic and foreign carriers, the carriers maintain separate billing databases from destination number databases to indicate billing rates for destination domains. However, it's not efficient to maintain the separate billing databases.

Hence, a need also exists for technologies for charging efficiently for the delivery of the SMS/MMS messages.

SUMMARY

The teachings herein alleviate one or more of the above noted problems relating to routing messages originating from a mobile station. Exemplary messages include Short Messaging Service (SMS) messages and Multimedia Messaging Service (MMS) messages.

The teachings below encompass methods for routing messages originating from a mobile station which is operable within a wireless network. The wireless network has a message service center which routes the messages to a destination mobile station.

The wireless carrier determines whether the message service center stores a Uniform Resource Identifier (URI) corresponding to a destination mobile directory number (MDN). The MDN is inputted via the mobile station. The message service center forwards the message based on the URI corresponding to the MDN when the message center corresponding to originating mobile stores the URI corresponding to the destination MDN. The URI may represent a resource of the destination mobile station.

The message service center sends a request to find the URI corresponding to the destination MDN from an external tElephone NUmber Mapping (ENUM) server, when the first center does not store the URI corresponding to the destination MDN. The message service center forwards the message based on the URI corresponding to the destination MDN obtained from the ENUM server when the external ENUM server sends the URI corresponding to the destination MDN.

The message includes a multimedia messaging service (MMS) message or a short messaging service (SMS) message.

The message service center may forward the message to an inter-carrier gateway. The inter-carrier gateway sends the message towards destination message service center corresponding to the URI, and the destination message service center sends the message to the destination terminal corresponding to the URI.

The originating message service center charges for delivery of the message based on a billing identifier corresponding to the recipient number stored in the originating message service center. The URI corresponding to the destination MDN or indication for ENUM query and the billing identification corresponding to the number are stored as a table in the origination message service center Another aspect of the disclosure encompasses a message service center system which routes a message originating from an originating mobile station which is operable within a wireless network. The message service center may route the message based on a URI corresponding to a target mobile directory number (MDN) inputted via the originating mobile station. The system also includes an ENUM server for storing URIs corresponding to MDNs. The center includes a peer table having a routing domain field for defining URIs corresponding to MDNs. The center refers to the peer table for finding the URI corresponding to the target MDN and sends the request to the ENUM server for finding the URI corresponding to the target MDN when the peer table does not have the URI corresponding to the target MDN.

The peer table includes billing identifiers corresponding to the MDNs for defining billing policy of carriers corresponding to the destination MDNs. The originating message service center performs the charging for delivery of the message to the originating mobile station based on the billing identifiers stored in the peer table. The routing field in the peer table indicates the URI corresponding to the target MDN if available in the peer table or indicates to send a request for translation of the target MDN to the corresponding URI to the ENUM server.

The message service center system may further comprise multiple message service centers and/or inter-carrier gateways in the path of the ultimate destination message service center servicing the destination MDN.

BRIEF DESCRIPTION OF THE DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In the following examples, while Multimedia Messaging Service (MMS) messages are addressed as a mobile message delivered over mobile networks, the subject matter also encompasses Short Messaging Service (SMS) messages or the like that are delivered over the mobile networks. For explanation, the MMS messages are described in the following examples. In addition, while a Multimedia Messaging Service Center (MMSC) is discussed as a server to deal with delivery of MMS messages in the following example, the subject matter encompasses a Messaging Service Center (MSC) to handle delivery of both MMS and SMS messages.

The various technologies disclosed in the examples below provide a method for routing an MMS message originating from a mobile station which is operable within a wireless network. The wireless network has a Multimedia messaging service Center (MMSC). The wireless carrier determines whether the MMSC stores a Uniform Resource Identifier (URI) corresponding to a destination mobile directory number (MDN) that is inputted via the mobile station. Then, the MMSC sends the MMS message to the URI corresponding to the MDN if the first MMSC stores the URI corresponding to the MDN.

If the first MMSC does not store the URI corresponding to the destination MDN, then the MMSC sends a request to find the URI corresponding to the destination MDN to an external ENUM server. The MMSC sends the MMS message to the URI corresponding to the destination MDN if the external ENUM server sends the URI corresponding to the destination MDN.

In both the cases, the amount that the originating MDN is charged for each recipient is determined via a billing identifier stored in the same peer table which stores either the URI corresponding to the destination MDN or stores an indicator for an ENUM query to be performed.

The MMSC forwards the MMS message to an inter-carrier gateway. The inter-carrier gateway sends the MMS message to another MMSC corresponding to the URI. The MMSC sends the MMS message to a destination terminal corresponding to the URI.

While the following embodiment describes delivery of MMS messages as an example, any type of messages including SMS messages which are available over the wireless carrier can be the subject matter of this application.

Figure 1:
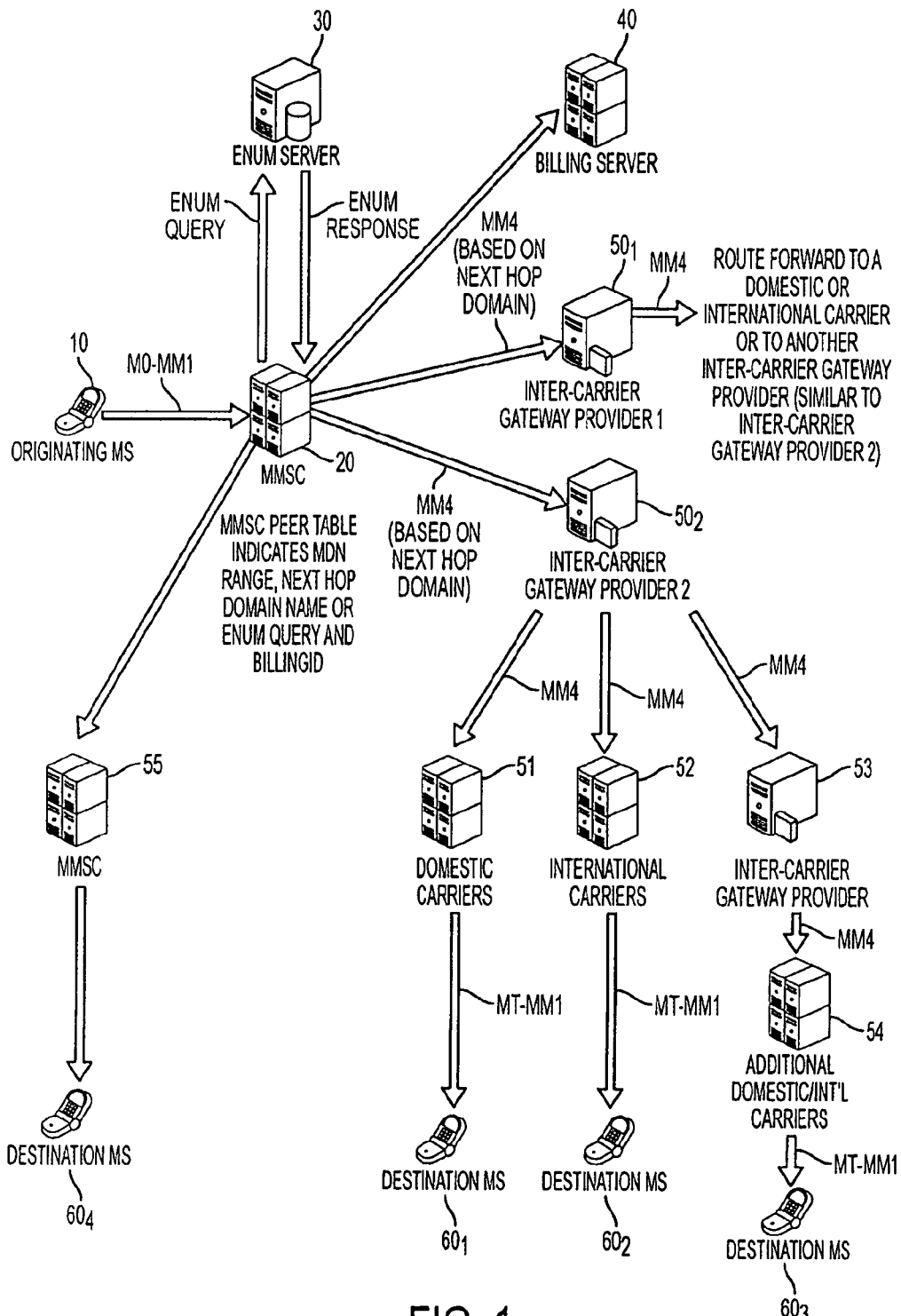
FIG. 1 illustrates a mobile messaging system including functionality of routing Short Messaging Service (SMS) and Multimedia Messaging Service (MMS) messages to international destination terminals and charging for delivery of the SMS and MMS service.

FIG. 1 illustrates a MMS system including functionality of routing SMS and MMS messages to international destination terminals and charging for delivery of the SMS and MMS service.

The MMS system includes various network types, such as 2G mobile networks, 3G mobile networks, internets, etc. The network interface is accommodated via interne protocols as well as other related network message protocols. In addition, the multimedia messages transfer protocols on the 2G/3G mobile network can be compatible with the existing multimedia message transfer protocols on the Internet.

The MMS is a standard for sending and receiving multimedia messages in a non-real-time communication mode. The MMS is designed to reuse existing wireless and IP protocols. MIME is chosen as the way of packaging up the different media components of the message. The MMS session is managed by Wireless Access Protocol (WAP), Internet Message Access Protocol (IMAP) or Session Initiation Protocol (SIP), all of which run over IP. This fits into existing wireless packet data technologies, e.g. General Packet Radio Service (GPRS), Code Division Multiple Access (CDMA) 1X, which are IP based.

The typical format of an MMS message comprises headers that provide the routing information and addresses of the recipients and senders of the MMS message, i.e., originating and destination address information. Further, a message body includes the multimedia message content, which may comprise different types or portions of multimedia content. By way of non-limiting example, such content may include: image content represented according to one or more image coding formats (e.g., JPEG, PNG, Bitmap, Graphics Interchange Format (GIF); formatted or plain text; audio content represented according to one or more audio coding formats (e.g., MP3, WAVeform (WAV), AMR, Enhanced Variable Rate CODEC (EVRC), Selectable Mode Vocoder (SMV) and Qualcomm Code Excited Linear Prediction (QCELP) etc.); and video content represented according to one or more video coding formats (e.g., MPEG and H.263).

Originating mobile station 10, from which the MMS message originates, has a radio connectivity with the mobile message system. The mobile message system includes a MMSC 20 for controlling delivery of MMS messages, an ENUM server to be referred by the MMSC for query of destination terminal's URI corresponding to a MDN number, and a billing server 40 to perform billing for the delivery of MMS messages. While the mobile network may have various functional elements for performing mobile communications, for simplicity, the elements involved in the MMS message service are described.

The mobile message system includes inter-carrier gateways $50_1$, $50_2$ which serve as an entrance from one carrier's network to another carrier's network. The inter-carrier gateway $50_1$ or $50_2$ may connect with domestic carriers 51 which serves domestic destination mobile stations $60_1$ and international carriers 52 which serves international destination mobile stations $60_2$. The inter-carrier gateway $50_1$ or $50_2$ may also connect with another inter-carrier gateway 53 which is an entrance to other domestic or international carriers 54. Each of the destination mobile stations $60_1$, $60_2$, $60_3$, at which the MMS message arrives, has a radio connectivity via the domestic or international carriers 51, 52 and the inter-carrier gateways $50_2$, $50_3$. Another domestic carrier MMSC 55 may connect with the originating carrier's MMSC 20 without intermediating of any inter-carrier gateway.

Referring to FIG. 1, an MMS user agent is installed in the mobile station 10 to provide multimedia messaging services. The MMS user agent is one of applications on the user terminal, which provides capabilities for viewing, editing, handling multimedia messages. It can send, receive and delete multimedia messages. The MMS user agent can support the Multipurpose Internet Mail Extension (MIME) protocols. Multimedia messages are represented in the MIME format. Based on various type fields, a multimedia message may contain text, picture, audio and/or video information.

The mobile station 10 may take many forms. For example, some mobile stations may be mobile telephone stations, at least some with enhanced display and user input capabilities to support browsing and other data communications applications in addition to voice telephone service. Some of these data services may be location based and require a fix on position of the mobile station. Other mobile stations 10 may comprise Portable Digital Assistants (PDAs) with built-in wireless communication capabilities. As another alternative, a wireless device such as a mobile transceiver having data communication capabilities may be connected to a portable computing device such as a handheld or laptop type computer.

Referring to FIG. 1, the MMSC 20 is responsible to send messages consisting of pure texts, pictures, videos, audios and other media over a network. The MMSC 20 is located on IP network, and is connected to a wireless network through a Packet Data Gateway or Wireless Application Protocol (WAP) gateway. Implementation of the MMSC 20 is independent of the specific wireless networks. For convenience, details of the IP and wireless networks are omitted from FIG. 1. The MMSC 20 can support MMS communications via multiple networks such as Global System for Mobile communications (GSM), General Packet Radio Service (GPRS), Wideband Code Division Multiple Access (WCDMA), Code Division Multiple Access (CDMA), CDMA2000 and the 3G networks in future.

Figures 2, 3:
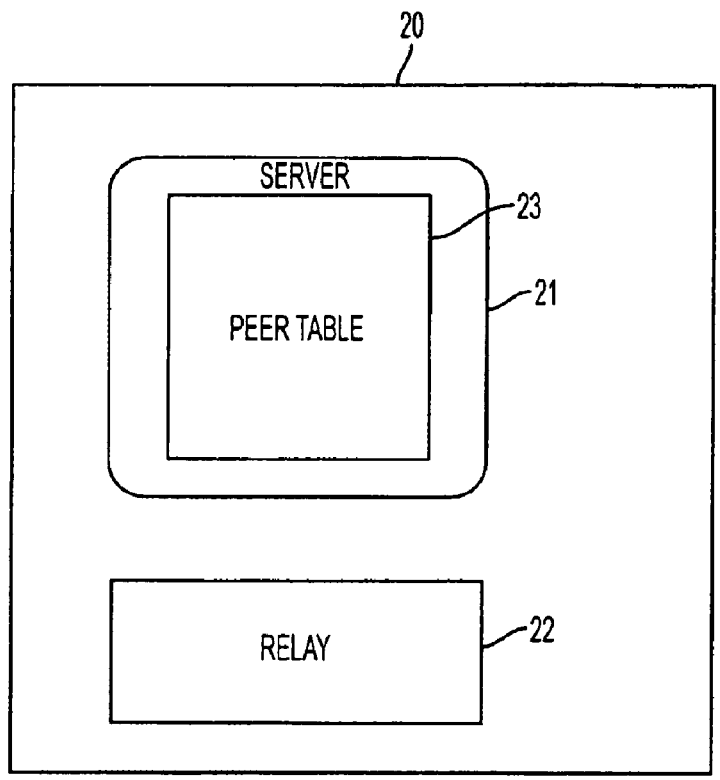
FIG. 2 illustrates an example of the Multimedia messaging service Center (MMSC) of FIG. 1
FIG. 3 illustrates a structure of the peer table of FIG. 2.

Referring to FIG. 2, the MMSC 20 may be implemented with a relay functionality 21 and a server functionality 22 which have functionalities of performing protocol transformation between different systems, content arrangement and storing, and generating charging data for billing purposes. The server functionality interacts with the client functionality on the terminal device, and the server writes messages to and reads messages from the message storage. The relay functionality supports various authentication and authorization functions as well as message routing.

The MMSC 20 communicates with the user terminal through a WAP gateway via the MM1 interface. The MM1 interface is the interface between the MMS mobile station 10 and the MMSC 20. The MM1 interface provides three basic messaging services; message submission, message retrieval, and message notification. The MMSC 20 communicates with other MMSCs via the MM4 interface, and their messages are carried via SMTP protocols over an appropriate IP network. The MM1-MM7 interfaces are defined by 3GPP2 MMS Specification.

Returning to FIG. 1, as a way for finding a destination domain to which the MMS message is routed, an ENUM server 30, an external server outside the MMSC 20, which identifies the wireless network carrier domain, e.g., by identifying a targeted MMS server in the domain based on a destination Mobile Directory Number (MDN) which is inputted via the originating mobile station 10, may be used. The ENUM server 30 takes a complete international or domestic destination MDN and resolves it into a series of URIs using a Domain Name System (DNS) based architecture. A country code in the MDN could be used to route the message to an ENUM server in that country. Each country may maintain a database for routing MMS messages to users in that country. The ENUM server 30 thus provides a mechanism for converting MDNs to URIs in the DNS environment.

While the ENUM server 30 is a convenient way to determine the route of the MMS message to a domestic or international destination terminal, the ENUM server is not available at some international network carriers or the Number Portability policies adopted by some international carriers may make the existing ENUM server useless. As another way to route the MMS messages to an international destination terminal without the ENUM server, the MMSC 20 provides a mapping table called a peer table 23 which includes a routing domain field $23_1$ to designate a domain corresponding to each destination MDN.

Referring to FIGS. 2 and 3, the routing field $23_1$ of peer table 23 for the MMSC 20, thus, is filled with a routing domain name corresponding to the destination MDN, e.g. domain A, if the peer table 23 has information on the corresponding domain. The domain is a URI that will be used to access a DNS server to fetch a Naming Authority Pointer (NAPTR) record. When the routing field $23_1$ is filled with a domain name such as domain A, the MMSC routes the MMS message to the domain of the routing field, e.g. domain A. When the peer table 23 does not have information on the corresponding domain, the MMSC requests the ENUM server 30 to provide the corresponding domain name. In this case, the routing field $23_1$ is filled with "ENUM" which indicates that the MMSC 20 has to refer to the ENUM server 30.

The peer table 23 also includes a separate field, Billing Identifier field $23_2$ which defines a pricing method for the MMS corresponding to the destination domain obtained from the routing domain field $23_1$. The Billing Identifier field $23_2$ defines a pricing plan corresponding to each domain.

Returning to FIG. 1, a billing server 40 receives the pricing plan stored in the Billing Identifierfield $23_2$ from the MMSC 20 whenever the MMS message is delivered to the destination terminal $60_1$, $60_2$, $60_3$. According to the pricing plan, the billing server charges bill for the delivery of the MMS message to the origination terminal 10 or destination terminal $60_1$, $60_2$, $60_3$.

Inter-carrier gateways $50_1$, $50_2$ communicate with the MMSC 20 over MM4 interface using Simple Mail Transmission Protocol (SMTP). The inter-carrier gateways $50_1$, $50_2$ also communicate with destination side MMSCs 51, 52. The destination side MMSCs include domestic carrier's MMSC 51 and international carrier's MMSC 52. The inter-carrier gateways $50_1$, $50_2$ may also communicate with another destination side inter-carrier gateway 53 over MM4 interface using SMTP. The inter-carrier gateways $50_1$, $50_2$ are nodes which serve as an entrance from one carrier's network to another network of domestic or international carrier. The inter-carrier gateways $50_1$, $50_2$ may be implemented with a PC, or a server having a functionality of routing data, here MMS messages between different carriers. Another domestic carrier's MMSC 55 may communicate with the MMSC 20 and messages originating from the originating MS 10 is forwarded to a destination MS $60_4$ via the MMSC 20 and the MMSC 55 based on MDN number.

Figure 4:
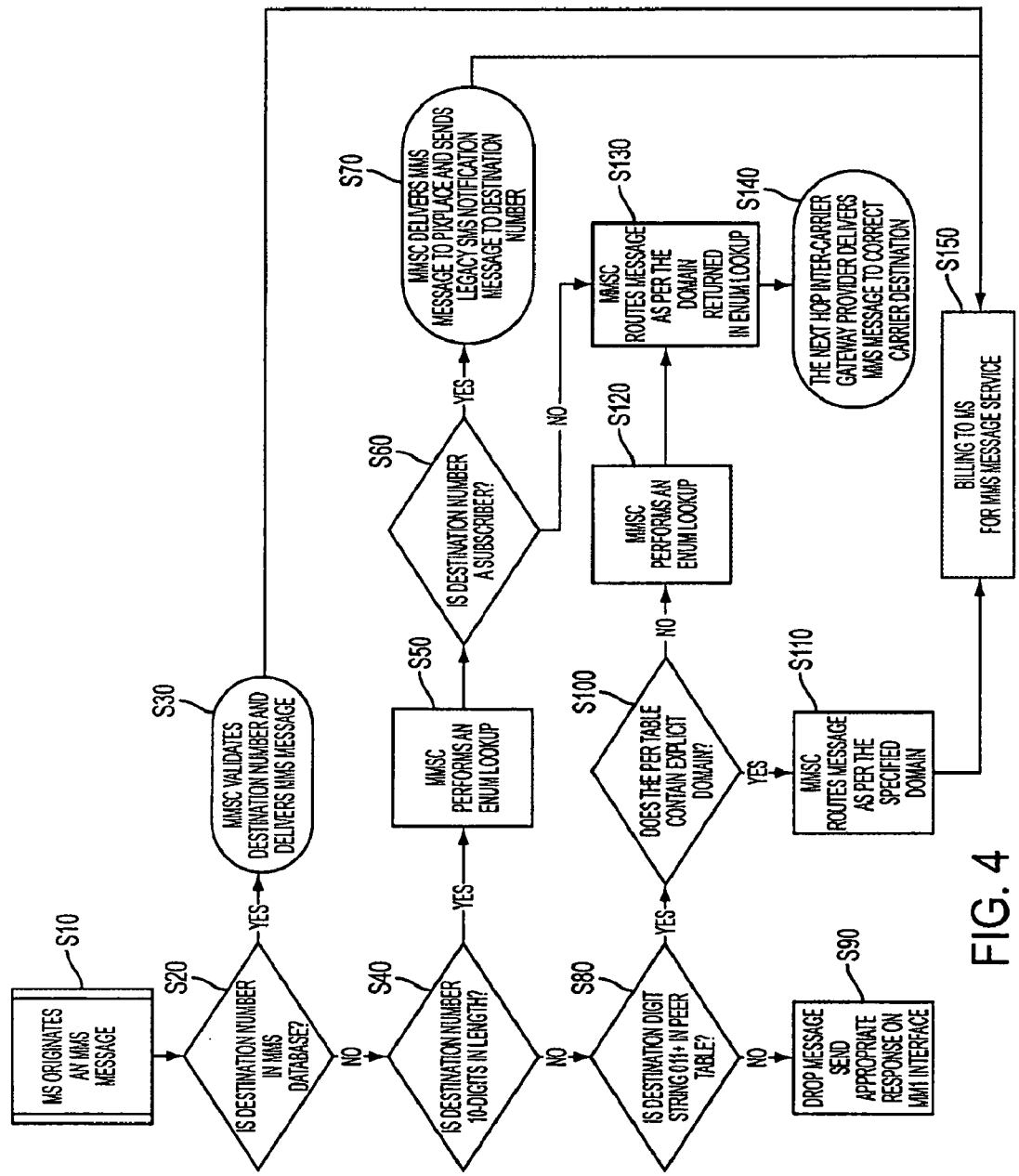
FIG. 4 is a flow diagram illustrating detailed steps of routing the MMS messages originated from a mobile station.

FIG. 4 is a flow diagram illustrating detailed steps of routing the MMS messages originated from a mobile station.

The mobile station 10 user inputs a destination MDN (e.g. 202-111-3333) and the station sends a MMS message for the destination MDN. (S10) The MMS message may be a pure text, audio, image, video or any combination of them. The MMSC 20 receives the MMS message and the destination MDN from the mobile station 10 through the MM1 interface via the wireless network currently servicing the mobile station 10. After receipt of the destination MDN, the MMSC 20 determines whether the destination MDN is one of a mobile station serviced by the carrier of the MMSC 20. (S20) If the destination MDN terminal is one for a mobile station serviced by the carrier of the MMSC 20 or another domestic carrier's MMSC 55, the MMSC 20 delivers the MMS message to the destination mobile station $60_4$ corresponding to the destination MDN directly or via the domestic carrier's MMSC 55. (S30)

If the destination MDN is not one for a mobile station serviced by the carrier of the MMSC 20, the MMSC 20 decides whether or not the destination MDN is an NANP number (North Americal Numbering Plan) MDN. (S40) When the destination MDN is a domestic one, e.g. 202-756-8000, the MMSC 20 sends an ENUM query message to the ENUM server 30 to request the translation of the destination MDN number to the corresponding URI. (S50) The ENUM server 30 translates the request for the destination MDN number (202-756-8000) into the ENUM domain corresponding to the MDN number, e.g. 2.2.3.4.5.6.7.8.9.9.9.3.e164.arpa. The translated request is sent to the DNS asking to look up the ENUM domain (2.2.3.4.5.6.7.8.9.9.9.3.e164.arpa.). The DNS returns a result in the form of a so called Naming Authority Pointer Resource (NAPTR) record. After receiving the destination URI, the MMSC 20 checks whether connectivity to the destination URI domain is supported by the MMSC 20. (S60)

If the destination URI domain is supported by the MMSC 20, then the MMSC 20 forwards the MMS message based on the destination URI of the domain returned by ENUM. (S70)

In the step S40, assume now that the destination MDN is not an NANP MDN. Hence, the MMSC 20 next checks whether or not the destination MDN is an international MDN, e.g. 011-81-111-222-4444. (S80) If the destination MDN is not an international MDN, e.g. no 011, the MMSC drops the MMS message which is not serviceable. Then, the MMSC sends notification that the message has been dropped to the originating mobile station 10 over the MM1 interface. (S90) If the destination MDN is an international MDN, e.g. with 011, then the MMSC 20 determines whether or not the peer table 23 in the MMSC 20 contains a domain corresponding to the destination international MDN. The domain may be a MMSC serviced by another wireless network or a server designated by a URI corresponding to the destination MDN. (S100)

If the peer table 23 contains the domain corresponding to the destination international MDN, the MMSC 20 delivers the MMS message to the corresponding domain. (S110) The MMSC 20 delivers the MMS message to the inter-carrier gateway $50_2$ over the MM4 interface and the inter-carrier gateway $50_2$ forwards the MMS message to the domain corresponding to the international MDN. Referring to FIGS. 2 and 3, if the international MDN number is "011-82233334444," the MMSC 20 looks up peer table 23 to find the corresponding domain, a URI corresponding to the international MDN number. Referring to FIG. 2, the corresponding domain, here domain B, is retrieved from the peer table 23. The MMSC 20 sends the MMS message to the retrieved URI, e.g. the MMSC of the international carrier 52 in FIG. 1. The MMSC of the international carrier 52 sends the received MMS message to destination terminal $60_1$ serviced by the international carrier. The MMS message may be delivered to another inter-carrier gateway 53 located in a foreign nation. In this case, the inter-carrier gateway 53 forwards the MMS message to a MMSC of a foreign domestic carrier 54 over the MM4 interface and the MMSC of the foreign domestic carrier 54 sends the MMS message to the destination terminal $60_3$.

If, in the step S100, the peer table 23 does not contain the domain corresponding to the destination international MDN, the MMSC sends an ENUM query message to the ENUM server 30 to request the translation of the destination MDN to the corresponding URI. (S120) The ENUM server 30 translates the request for the destination MDN number (011-82233334444) into the ENUM domain corresponding to the MDN number, e.g. 3.1.2.1.5.6.7.8.1.4.2.3.e164.arpa. The translated request is sent to the DNS asking to look up the ENUM domain (3.1.2.1.5.6.7.8.1.4.2.3.e164.arpa.). The DNS returns a result in the form of a so called NAPTR record. The response is a URI that can be reached in the Internet.

After receiving the destination URI from the ENUM server 30, the MMSC 20 routes the MMS message to a server corresponding to the destination URI. Since the destination URI is an international one, the server corresponding to the destination URI is the inter-carrier gateway $50_2$, and the MMS message is forwarded to the inter-carrier gateway $50_2$. (S130) If, in the step S60, the destination URI is not the address of the terminal supported by the MMSC 20, the MMSC 20 routes the MMS message to the inter-carrier gateway $50_2$, too.

The international carrier 52 sends the received MMS message to destination terminal $60_1$ serviced by the international carrier. (S140) The MMS message may be delivered to another inter-carrier gateway 53 located in a foreign nation. In this case, the inter-carrier gateway 53 forwards the MMS message to the foreign domestic carrier 54 over the MM4 interface and the foreign domestic carrier 54 sends the MMS message to the destination terminal $60_3$.

In the steps S30, S70 and S110, after routing the MMS message to the destination mobile station, the billing server 40 bills a fee for the MMS message to the originating station 10 or the destination mobile station $60_1, 60_2, 60_3$. (S150) The billing server 40 retrieves the pricing plan stored in the Billing Identifier field $23_2$ from the MMSC 20 and charges according the pricing plan.

As shown by the above discussion, functions relating to the message routing are implemented on computers connected for data communication via the components of a packet data network, operating as an MMSC and/or as an ENUM database server as shown in FIG. 1. Although special purpose devices may be used, such devices also may be implemented using one or more hardware platforms intended to represent a general class of data processing device commonly used to run 'server' programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. tables for the routing and/or user's messages. The software code is executable by the general-purpose computer that functions as the server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for inter-carrier routing of messages, in essentially the manner performed in the implementations discussed and illustrated herein.

Figure 5:
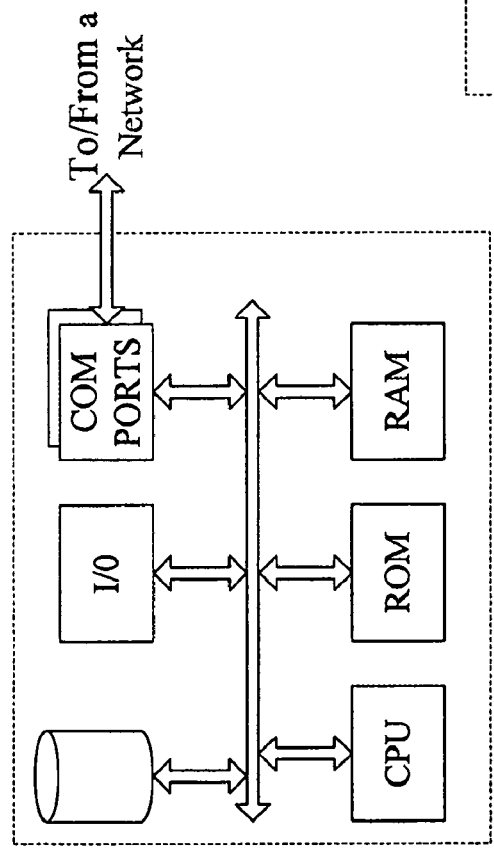
FIG. 5 illustrates a network or host computer platform that may be used to implement a server.
Figure 6:
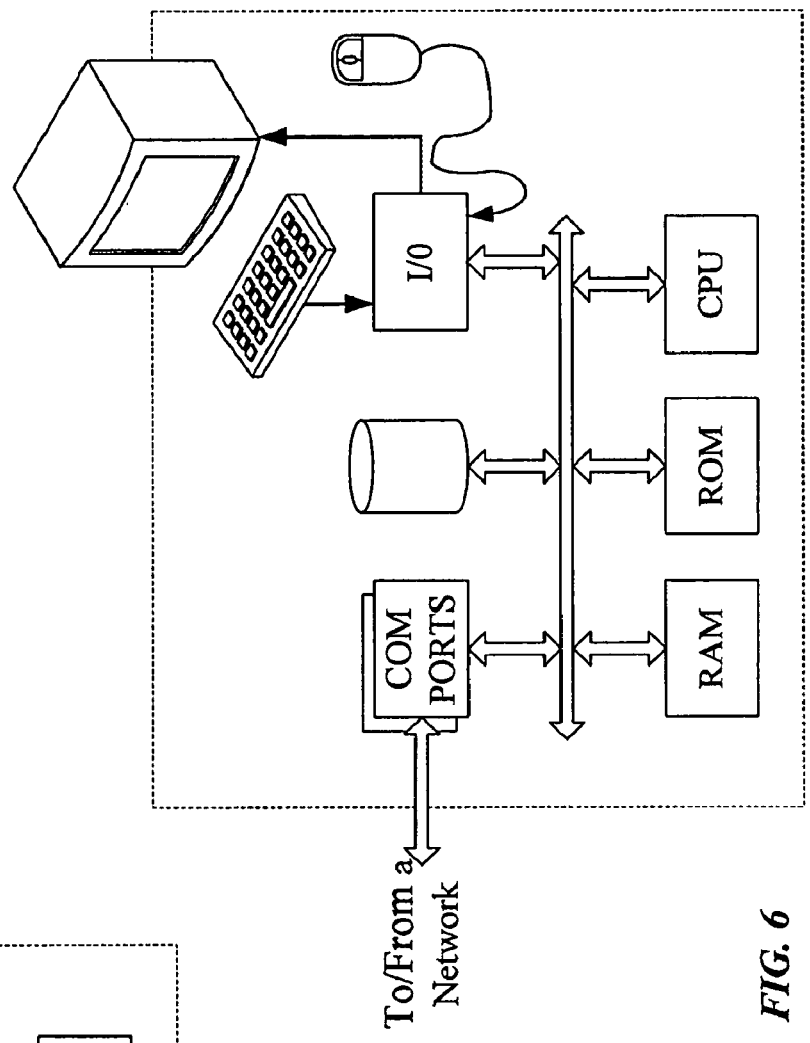
FIG. 6 depicts a computer with user interface elements that may be used to implement a personal computer or other type of work station.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station, although computer of FIG. 6 may also act as a server if appropriately programmed. A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods outlined above may be embodied in programming, e.g. in the form of software, firmware, or microcode executable by a server or other programmable device. Such programming typically is carried on or otherwise embodied in a medium or media. Terms such as "machine-readable" medium and "computer-readable" medium as used herein generically refer to any tangible medium that participates in providing instructions and/or data to a programmable processor, such as the CPU or other processor of a server computer or the like, for execution or other processing. A medium may take many forms, including but not limited to, non-volatile storage media and volatile storage media. Non-volatile storage media include, for example, optical or magnetic disks and flash memory. Volatile storage media include dynamic memory, such as main memory or cache. Hence, common forms of machine-readable storage media include, for example, a floppy disk, a flexible disk, a hard disk, a magnetic tape, any other magnetic medium, a CD or CDROM, a DVD or DVD-ROM, any other optical medium, punch cards, paper tape, any other physical medium with patterns of holes, a RAM, a PROM, an EPROM, an EEPROM, a FLASH-EPROM, a cache memory, or any other memory chip or cartridge.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

| | |
|---|---|
| ENUM: | tElephone NUmber Mapping |
| MDN: | Mobile Directory Number |
| MMS: | Multimedia Messaging Service |
| SMS: | Short Messaging Service |
| MSC: | Message Service Center |
| MMSC: | Multimedia Messaging Service Center |
| DNS: | Domain Name System |
| URI: | Uniform Resource Identifier |
| MIME: | Multipurpose Internet Mail Extension |
| IMAP: | Internet Message Access Protocol |
| SIP: | Session Initiation Protocol |
| GPRS: | General Packet Radio Service |
| CDMA: | Code Division Multiple Access |
| EVRC: | Enhanced Variable Rate CODEC |
| SMV: | Selectable Mode Vocoder |
| QCELP: | Qualcomm Code Excited Linear Prediction |
| MPEG: | Moving Picture Experts Group |
| WAV: | WAVeform |
| WAP: | Wireless Application Protocol |
| GSM: | Global System for Mobile communications |
| GPRS: | General Packet Radio Service |
| WCDMA: | Wideband Code Division Multiple Access |
| SMTP: | Simple Mail Transfer Protocol |
| PDA: | Portable Digital Assistant |
| GIF: | Graphics Interchange Format |

What is claimed is:

1. A method for routing mobile messaging service (MMS) messages originating from any of a plurality of mobile stations which is operable within a wireless network of a carrier, the wireless network of the carrier having a mobile messaging service center (MMSC), comprising steps of:

(a) for each respective MMS message received at the MMSC from any of the mobile stations through the carrier's wireless network, determining whether the MMSC stores a Uniform Resource Identifier (URI) corresponding to a destination mobile directory number (MDN), which is contained in the respective MMS message; and (b) forwarding a first of the received MMS messages from the MMSC to a network of another carrier based on the URI stored in the MMSC corresponding to the MDN contained in the first MMS message, when the MMSC stores the URI corresponding to the MDN contained in the first MMS message;

(c) obtaining a URI corresponding to the destination MDN of a second of the received MMS messages from an external telephone number mapping (ENUM) server, when the MMSC does not store the URI corresponding to the destination MDN contained in the second MMS message; and (d) forwarding the second MMS message from the MMSC to a network of another carrier based on the URI obtained from the external ENUM server.

2. The method of claim 1, wherein the step (b) includes:
forwarding the first MMS message to an inter-carrier gateway;
sending the first MMS message by the inter-carrier gateway to a second MMSC corresponding to the URI; and
sending the first MMS message by the second MMSC to a destination terminal corresponding to the URI.

3. The method of claim 1, further comprising:
charging for delivery of the first or second MMS message based on a billing identification corresponding to the destination MDN or URI stored in the first MMSC.

4. The method of claim 3, wherein the URI corresponding to the destination MDN and the billing identification corresponding to the destination MDN or URI are stored as a table in the first MMSC.

5. A multimedia messaging service (MMS) routing system for routing MMS messages received from any of a plurality of originating mobile stations which is operable within a wireless network of a carrier, the system comprising:
a multimedia messaging service center (MMSC) of the carrier's network for routing each respective received MMS message based on a URI corresponding to a target mobile directory number (MDN) inputted via an originating mobile station contained in the respective MMS message;
a peer table having a routing domain field for defining URIs corresponding to MDNs stored the MMSC; and
an ENUM server for storing URIs corresponding to MDNs, coupled for communication with the MMSC,
wherein the MMSC is configured to:
refer to the peer table for finding a URI corresponding to the target MDN contained in a first of the respective received MMS messages and forward the first respective received MMS message to a network of another carrier based on the URI corresponding to the target MDN contained in the first respective received MMS message,
obtain from the ENUM server a URI corresponding to the target MDN contained in a second of the respective received MMS messages when the peer table does not have the URI corresponding to the target MDN contained in the second respective received MMS message, and
forward the second respective received MMS message to a network of another carrier based on the URI obtained from the ENUM server.

6. The system of claim 5, wherein the peer table includes billing identifiers corresponding to the MDNs or the returned URI for defining billing policy of carriers corresponding to the destination MDNs.

7. The system of claim 6, wherein the first MSC performs the charging for delivery of the message to the originating mobile station based on the billing identifiers stored in the peer table.

8. The system of claim 5, wherein the routing field in the peer table indicates the URI corresponding to the target MDN if available in the peer table or indicates to send a request to the ENUM server for translation of the target MDN to the corresponding URI.

9. The system of claim 5, further comprising:
a second MMSC corresponding to the URI obtained from the first MMSC;
an inter-carrier gateway for receiving the MMS message routed from the first MMSC and forwarding the MMS message to the second MMSC of a target carrier based on the URI obtained at the first MMSC.

10. An article, comprising:
a non-transitory machine readable storage medium; and
programming embodied in the non-transitory machine readable storage medium for execution by a programmable processor of a multimedia messaging service center (MMSC) of a wireless network of a carrier, for configuring the MMSC to perform functions comprising:
(a) receive mobile messaging service (MMS) messages originating from any of a plurality of mobile stations via the wireless network of the carrier;
(b) for each respective MMS message received at the MMSC from any of the mobile stations through the carrier's wireless network, determine whether the MMSC stores a Uniform Resource Identifier (URI) corresponding to a destination mobile directory number (MDN), which is contained in the respective MMS message; and
(c) forward a first of the received MMS messages from the MMSC to a network of another carrier based on the URI stored in the MMSC corresponding to the MDN contained in the first MMS message, when the MMSC stores the URI corresponding to the MDN contained in the first MMS message;
(d) obtain a URI corresponding to the destination MDN of a second of the received MMS messages from an external telephone number mapping (ENUM) server, when the MMSC does not store the URI corresponding to the destination MDN contained in the second MMS message; and
(e) forward the second MMS message from the MMSC to a network of another carrier based on the URI obtained from the external ENUM server.

* * * * *

UNITED STATES PATENT AND TRADEMARK OFFICE
CERTIFICATE OF CORRECTION

| | | |
|---|---|---|
| PATENT NO. | : 7,746,864 B1 | |
| APPLICATION NO. | : 12/149311 | |
| DATED | : June 29, 2010 | |
| INVENTOR(S) | : Manjari Asawa et al. | |

It is certified that error appears in the above-identified patent and that said Letters Patent is hereby corrected as shown below:

On the title page item "(73) Assignee", change

"Cello Partnership" to --Cellco Partnership D/B/A Verizon Wireless--.

Signed and Sealed this

Fifth Day of October, 2010

David J. Kappos
*Director of the United States Patent and Trademark Office*